United States Patent
Gholmieh et al.

(10) Patent No.: US 8,331,969 B2
(45) Date of Patent: Dec. 11, 2012

(54) METHODS AND APPARATUS FOR SERVICE ACQUISITION IN A BROADCAST SYSTEM

(75) Inventors: Ralph Akram Gholmieh, San Diego, CA (US); An Mei Chen, San Diego, CA (US); Michael DeVico, San Diego, CA (US); Sajith Balraj, San Diego, CA (US); Ying Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 779 days.

(21) Appl. No.: 12/107,684

(22) Filed: Apr. 22, 2008

(65) Prior Publication Data

US 2008/0268787 A1      Oct. 30, 2008

Related U.S. Application Data

(60) Provisional application No. 60/914,016, filed on Apr. 25, 2007.

(51) Int. Cl.
    *H04Q 7/20*        (2006.01)
(52) U.S. Cl. ............... 455/515; 455/414.1; 455/574; 455/550.1; 455/343.1; 455/343.2; 370/310; 370/310.2; 370/311; 370/328; 370/329
(58) Field of Classification Search .......... 455/515, 455/500, 517, 445, 574, 550.1, 343.1–343.4, 455/426.1, 426.2, 422.1, 403, 434, 3.01, 455/3.05, 414.1–414.4; 370/310, 310.2, 370/311, 328, 329, 330
See application file for complete search history.

(56) References Cited

U.S. PATENT DOCUMENTS

| | | | |
|---|---|---|---|
| 6,236,850 B1 | 5/2001 | Desai | |
| 7,564,799 B2 * | 7/2009 | Holland et al. | 370/252 |
| 2005/0200520 A1 | 9/2005 | Jesson | |
| 2005/0238047 A1 | 10/2005 | Holland et al. | |

(Continued)

FOREIGN PATENT DOCUMENTS

JP      11234201 A      8/1999

(Continued)

OTHER PUBLICATIONS

International Preliminary Report on Patentability, PCT/US2008/061449, International Bureau, The International Bureau of WIPO, Nov. 5, 2009.

(Continued)

*Primary Examiner* — Keith Ferguson
(74) *Attorney, Agent, or Firm* — Ryan N. Farr

(57) ABSTRACT

Methods and apparatus for service acquisition in a broadcast system. In an aspect, a method includes detecting whether a loss of service has occurred, and initiating acquisition attempts during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed. An apparatus includes interface logic configured to detect whether a loss of service has occurred, and processing logic configured to initiate acquisition attempts during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed.

50 Claims, 6 Drawing Sheets

U.S. PATENT DOCUMENTS

| | | | |
|---|---|---|---|
| 2005/0246417 A1* | 11/2005 | Raith et al. | 709/203 |
| 2006/0063544 A1 | 3/2006 | Zhao et al. | |
| 2007/0082688 A1 | 4/2007 | Tu et al. | |
| 2007/0225051 A1* | 9/2007 | Nader et al. | 455/574 |
| 2008/0056226 A1* | 3/2008 | Zhao et al. | 370/342 |
| 2008/0170530 A1* | 7/2008 | Connors et al. | 370/312 |
| 2008/0220762 A1* | 9/2008 | Welnick et al. | 455/422.1 |

FOREIGN PATENT DOCUMENTS

| | | |
|---|---|---|
| JP | 2005167749 A | 6/2005 |
| JP | 2006505200 A | 2/2006 |
| KR | 20050072475 A | 7/2005 |
| WO | 90/10360 | 9/1990 |
| WO | 92/08295 | 5/1992 |
| WO | WO2007044918 | 4/2007 |

OTHER PUBLICATIONS

International Search Report, PCT/US2008/061449, International Searching Authority, Mar. 12, 2009, European Patent Office.

Written Opinion, PCT/US2008/061449, International Searching Authority, Mar. 12, 2009, European Patent Office.

Translation of Office Action in Korean application 10-2009-7024455 corresponding to U.S. Appl. No. 12/107,684, dated Nov. 3, 2011.

* cited by examiner

METHODS AND APPARATUS FOR SERVICE ACQUISITION IN A BROADCAST SYSTEM

CLAIM OF PRIORITY UNDER 35 U.S.C. §119

The present Application for Patent claims priority to Provisional Application No. 60/914,016 entitled "Methods and Apparatus for Service Requisition" filed Apr. 25, 2007, and assigned to the assignee hereof and hereby expressly incorporated by reference herein.

BACKGROUND

1. Field

The present application relates generally to the operation of wireless communication devices, and more particularly, to methods and apparatus for service acquisition in a broadcast system.

2. Background

When a wireless communication device is not able to receive a usable signal from a serving system it is said to be out-of-service (OOS). Typically, when out-of-service, the wireless communication device attempts to acquire a usable signal so that service from the serving system can be established. In its attempts to acquire a usable signal, the wireless communication device expends battery power attempting to acquire usable signals that may not be readily available, which reduces the device's available operating time before the battery needs recharging. If the wireless communication device continuously attempts to acquire a usable signal, and such a signal is not readily available in the wireless communication device's current operating environment, the battery power will quickly be consumed with no beneficial result. For example, modern broadcast systems may transmit data in bursts whereby the device is active either to detect a beacon signal or to get data intended for it. When the device is searching for service, it does not have any timing information and thus must be active continuously; this leads to higher current consumption in the out-of-service state.

Therefore, what is needed is a mechanism that operates to provide service acquisition processing at a wireless communication device that allows an out-of-service device to efficiently acquire a usable signal to establish service.

SUMMARY

In one or more aspects, a service acquisition system, comprising methods and apparatus, is provided that operates to control how a wireless communication device attempts to acquire service when in an out-of-service state. In various aspects, the service acquisition system provides an algorithm that comprises an aggressive phase during which the device attempts to acquire service at relatively short time intervals. In an aspect, the aggressive phase provides for increasing the time interval between multiple acquisition attempts. In another aspect, the algorithm is modified to comprise the aggressive phase followed by an extended acquisition phase. During the extended acquisition phase, the device attempts to acquire service at relatively longer time intervals. For example, during the extended acquisition phase, the device attempts to acquire service periodically using a relatively long fixed duration time interval between successive acquisition attempts so that power consumption at the device can be controlled. The algorithm also responds to requests for content during acquisition attempts by expiring timers and/or resetting itself to establish service more quickly. Thus, the service acquisition system operates to adjust the aggressiveness with which service acquisition is attempted during the aggressive phase while controlling battery power utilization at a device during the extended acquisition phase.

In an aspect, a method is provided for service acquisition in a broadcast system. The method comprises detecting whether a loss of service has occurred, and initiating at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed.

In an aspect, an apparatus is provided for service acquisition in a broadcast system. The apparatus comprises interface logic configured to detect whether a loss of service has occurred, and processing logic configured to initiate at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed.

In an aspect, an apparatus is provided for service acquisition in a broadcast system. The apparatus comprises means for detecting whether a loss of service has occurred, and means for initiating at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed.

In an aspect, a computer program product is provided for service acquisition in a broadcast system. The computer program product comprises a machine-readable medium that comprises a first set of codes for causing a computer to detect whether a loss of service has occurred, and a second set of codes for causing the computer to initiate at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed.

In an aspect, at least one integrated circuit is provided that is configured for service acquisition in a broadcast system. The at least one integrated circuit comprises a first module configured to detect whether a loss of service has occurred, and a second module configured to initiate at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
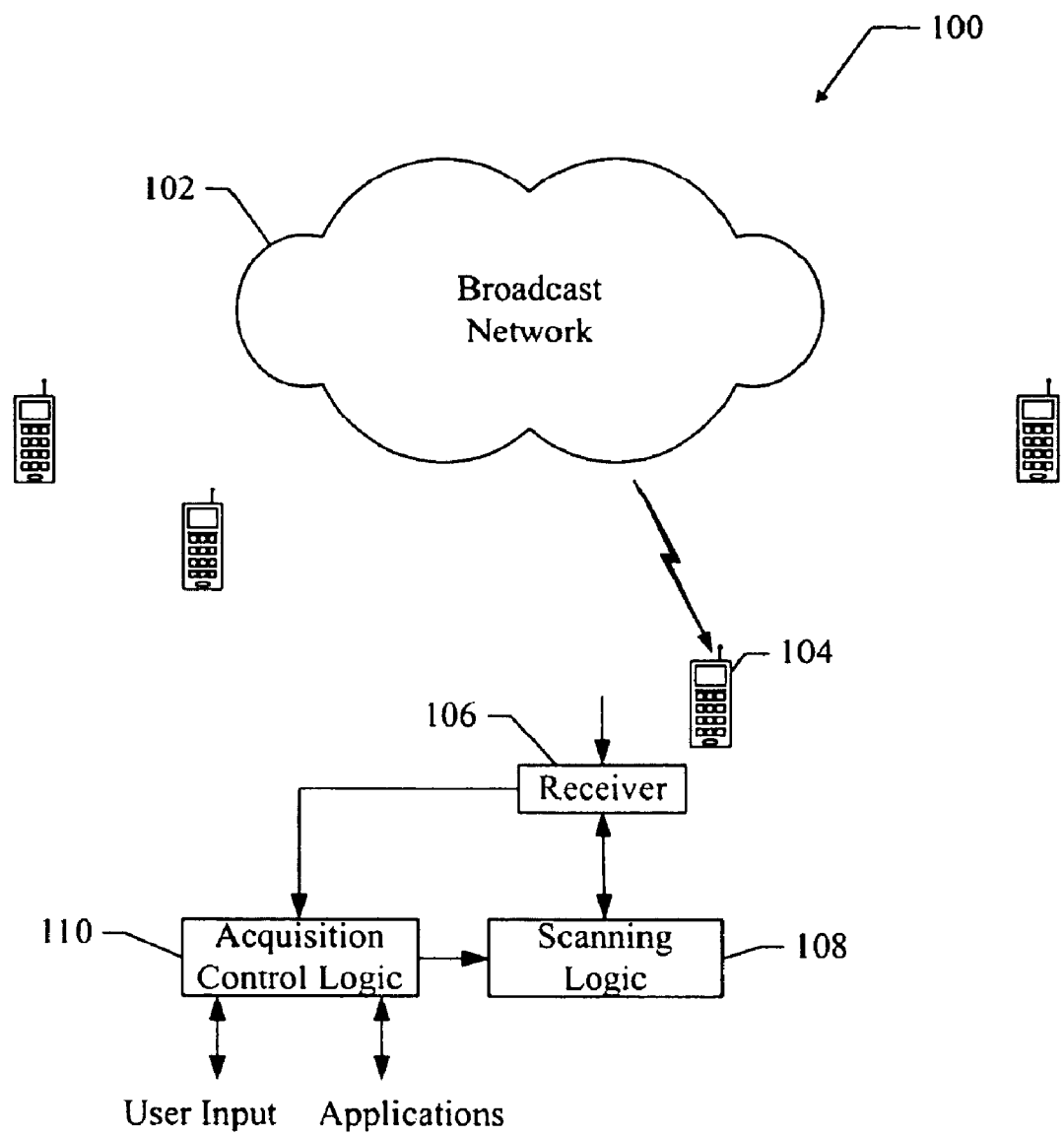
FIG. 1 shows a network that illustrates aspects of a service acquisition system.
Figure 1:
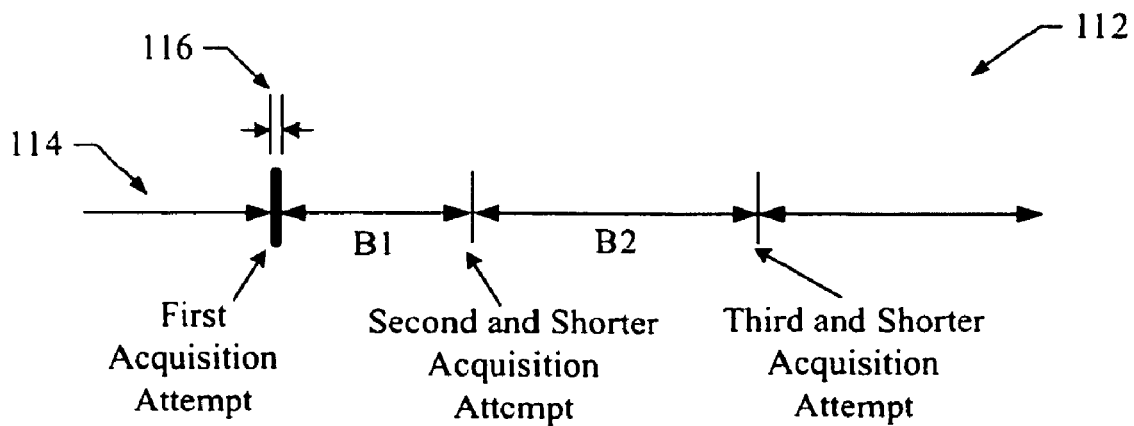

In various aspects, a service acquisition system is provided that operates to control how a wireless communication device attempts to acquire service when in an out-of-service state.

Introduction

A device may need to acquire a forward link only (FLO) signal successfully before decoding content flows and/or providing updated services to a device user or applications executing at the device. In various aspects, the service acquisition system described herein provides an algorithm and/or a set of procedures that can be used for acquiring service in a broadcast network.

In an aspect, a device attempts to receive a transmission frame that is packed with distribution multiplexes and transmitted as a forward link only signal over a broadcast network. The transmission frame may comprise one or more sub-frames that are used to convey wide area and local area content. For example, wide area content is distributed over one or more wide geographic regions of the network, and local area content is distributed over one or more local geographic regions of the network. Each sub-frame comprises a wide area partition that is packed with the wide area content, and a local area partition that is packed with the local area content.

At the start of the transmission frame are pilots symbols and overhead information symbols (OIS) that provide timing and control information that is used for synchronization and to locate content and overhead information carried as part of the wide and local area content. The OIS comprises a wide OIS portion that contains control information for the wide area content, and a local OIS portion that contains control information for the local area content.

Since wide-area and local-area signals may be acquired and lost independently, loss of local-area acquisition can occur without loss of wide-area acquisition and vice-versa. Thus, all the algorithms presented herein may be run for wide-area and local-area signal acquisition independently.

Inner-Loop Acquisition Logic

At the physical layer, signal acquisition is achieved by synching to the pilot symbols, decoding identification and overhead channels, and recovering from loss of channel lock. For wide-area signal acquisition, the wide area identification and overhead symbols may need to be decoded successfully. For local-area signal acquisition, the local area identification and overhead symbols may need to be decoded successfully.

The inner-loop acquisition logic operates to attempt wide and/or local signal acquisition for a set number of consecutive seconds before being deemed unsuccessful. For example, if the inner-loop acquisition logic is unsuccessful in finding pilot symbols broadcast as part of the transmission frame, then the device is considered to be out-of-service. Since the device has no timing information from the broadcast system, the device receiver chain is continuously active trying to detect the pilot symbols, which may lead to high battery drain. If service is present, then the inner-loop acquisition logic will be able to detect the overhead symbols and any other physical layer channels, such as one or more control channels, before declaring the system to be acquired.

In various aspects described herein, the service acquisition system operates to control the operation of the inner-loop acquisition logic. For example, the service acquisition system operates to control when and for how long the inner-loop acquisition logic scans in an attempt to acquire the serving system. Thus, any suitable type of inner-loop logic may be used with aspects of the service acquisition system. Therefore, since any type of inner-loop acquisition logic may be used, detailed descriptions of the inner-loop acquisition logic are not necessary for an understanding of the service acquisition system and are not provided herein.

Outer-Loop Algorithm

In various aspects, the service acquisition system comprises an outer-loop algorithm that provides a mechanism for acquiring service during extended out-of-service conditions from which a single inner-loop acquisition attempt cannot recover. In an aspect, the outer-loop algorithm includes an aggressive phase wherein service acquisition is aggressively pursued. In an aspect, the aggressive phase comprises varying time intervals between successive inner-loop acquisition attempts. For example, the aggressive phase may comprise an exponentially increasing time interval between successive inner-loop acquisition attempts until either system acquisition is achieved, or the maximum allowed number of inner-loop acquisition attempts is reached. This increasing time interval is referred to as a backoff interval. Furthermore, the duration of the inner-loop scanning attempt may be varied between successive attempts. In one aspect, the duration of the inner-loop is reduced as the chance of recovery becomes less likely. It should be noted that the duration of the inner-loop may be further extended, for example, when hysteresis is added when moving between different data sources. In an aspect, if a request to decode a content flow is received during operation of the outer-loop algorithm, the outer-loop algorithm is reset to the beginning so that acquisition can be pursued most aggressively.

In another aspect, an extended outer-loop algorithm is provided that adds an extended acquisition phase if the device is still out of coverage after the end of the aggressive phase. Thus, in various aspects, the outer-loop algorithm comprises two parts, an aggressive acquisition phase, followed by an extended acquisition phase.

In another aspect, the service acquisition system reacts to longer or shorter inner-loop scanning by adjusting a subsequent sleep timer. The sleep timer is used in the extended acquisition phase to control power consumption to achieve a desired average power consumption.

In another aspect, the outer-loop algorithm responds differently to flow activations (i.e., requests for content). For example, instead of resetting the algorithm in response to flow activation, the algorithm expires whatever timer is currently set and continues to run as if the timer expired normally. Therefore, a request to download data by an upper layer application triggers one of, a reset, no effect, or the expiration of a timer used in the algorithm. The choice of which action to take depends on the settings of various parameters of the algorithm.

The service acquisition system also operates to provide different functions based on the phase during which service is acquired. In the aggressive phase, the device is searching for service and may resume interrupted operations immediately after service recovery. For example, if service was lost while receiving data transmitted as a video stream that was being viewed on the device, an immediate system recovery by the service acquisition system results in a resumption of the display of the video stream to the user of the device. If service is lost and the service acquisition system enters the extended phase, when the system is recovered the service acquisition system may only signal system availability to the device user since the user may no longer be interested in the previously received data due to the extended loss of service. Furthermore, the service acquisition system may announce to the user in the aggressive phase that the device is attempting to recover service, while later attempts in the extended phase will be run in the background without user notification.

The service acquisition system in the extended phase can control service acquisition so that battery power is consumed at a rate similar to an in-service device that is idle. For example, in case of a service loss while playing a content channel, the service acquisition system displays a scanning for service message and scans for service for a first time interval (i.e., 20 seconds). If service is not recovered, later scans are conducted for shorter time intervals (i.e., 5 s, 5 s, and then 1 s thereafter) leading to savings in battery life.

Thus, the service acquisition system provides a mechanism for establishing connectivity between a data source and a data collecting device. Although the various aspects described below are geared towards wireless broadcast systems, one skilled in the art may easily apply such techniques to wire-line systems and any other communication broadcast medium.

FIG. 1 shows a network 100 that illustrates aspects of a service acquisition system. The network 100 comprises a broadcast network 102 and a wireless communication device 104. The broadcast network 102 may comprise any type of wireless and/or wired communication network and cover any desired geographic region. The broadcast network 102 operates to broadcast any type of content, services, data or any other type of information to devices within its geographic region using any suitable type of broadcast technique or technology.

The wireless communication device 104 is operable to receive broadcasts from the broadcast network 102 and may be any type of cell phone, PDA, email device, pager, computer, or any other type of device that is able to receive broadcasts from the broadcast network 102 using the appropriate technology. For example, at power-up, the wireless communication device 102 is operable to establish service with the broadcast network 102 and maintain service as the wireless communication device 104 moves within the region covered by the broadcast network 102.

The wireless communication device 104 comprises a receiver 106 that operates to search for and acquire service with the broadcast network 102. For example, the receiver 106 is operable to tune to designated radio frequencies and receive transmissions from the broadcast network 102 on those frequencies. The operation of the receiver 106 to establish service with the broadcast network 102 requires the use of battery power. Thus, the longer the receiver 106 takes to search for and establish service with the broadcast network 102, the more battery power is utilized.

In an aspect, the receiver 106 provides information regarding the current status of service to acquisition control logic 110. For example, the receiver provides status information to the acquisition control logic 110 that indicates whether or not the device 104 is currently in-service or out-of-service. In an aspect, the acquisition control logic 110 operates to receive information and/or requests associated with a user or one or more applications. Based on the received information and/or requests, the acquisition control logic 110 operates to perform an acquisition algorithm to control how attempts to acquire service are performed by scanning logic 108.

In various aspects, the scanning logic 108 operates as part of inner-loop acquisition logic to control the receiver 106 to scan for service in the device's current location. The scanning logic 108 may be controlled to scan for service for selected time durations and may also be controlled as to how frequently scanning is to occur. In various aspects, the acquisition control logic 110 operates to control the frequency and duration of the acquisition attempts performed by the scanning logic 108 so as to control how aggressively to scan for service and to control battery power consumption. Thus, the acquisition control logic 110 can control the scanning logic 108 to scan aggressively during an aggressive acquisition phase and control how battery power is consumed during an extended acquisition phase.

A timing diagram 112 illustrates the operation of the service acquisition system to perform service acquisition during the aggressive phase. For example, at time 114, it is assumed that the device 104 is out-of-service. For example, the device 104 may have just powered on, or the device 104 may have been in-service and recently lost service. In an aspect, the acquisition control logic 110 operates to control the scanning logic 108 to perform a first acquisition attempt (i.e., inner-loop acquisition) that lasts for a first selected duration, as indicated at 116.

If service acquisition is unsuccessful, the acquisition control logic 110 operates to control the scanning logic 108 to wait for a first backoff interval (B1) and then perform a second acquisition attempt that lasts for a second selected duration that may be the same or different from the first selected duration. If acquisition is again unsuccessful, the acquisition control logic 110 operates to control the scanning logic 108 to wait for a second backoff time interval (B2) and then perform a third acquisition attempt that lasts for a third selected duration that may be the same or different from the first selected duration. This process continues until service is acquired or the number of acquisition attempts reaches a selected limit. During this process, the acquisition control logic 110 operates to provide status indications to a user and/or applications executing at the device 104.

If service is acquired, the acquisition control logic 110 operates to either re-establish content flow downloads if any are pending, or end all downloads if too much time has gone by. In an aspect, the acquisition control logic 110 processes information received from a user and/or applications at the device 104 to adjust the operation of the acquisition algorithm. For example, if a new request to decode a content flow (i.e., flow activation) is received during the operation of the acquisition algorithm, the acquisition control logic 110 operates to adjust the operation of the acquisition algorithm, which controls the operation of the scanning logic 108. A more detailed description of how the acquisition algorithm is adjusted is provided in other sections of this document.

Therefore, in various aspects, the service acquisition system operates to perform one or more of the following functions to provide service acquisition and control battery power usage.

1. Detect when a device is out-of-service.
2. Determine start time and duration for an acquisition attempt.

3. Control inner-loop scanning logic to attempt service acquisition at the start time and for the determined duration.
4. If service is acquired, re-establish any pending flow downloads.
5. If service is not acquired, determine the next acquisition start time and duration based on a backoff timer. Based on set preferences, either end all flow downloads or put flow downloads in pending state. In an aspect, flow downloads are ended at the first unsuccessful scanning. In another aspect, flow downloads are ended at the end of the aggressive phase. Note that successive start times and durations may have any type of relationship to each other.
6. Return operation 3 above.

Therefore, in various aspects, the acquisition system operates to control when and for how long a device scans for service acquisition. For example, the acquisition system operates to perform an aggressive phase to acquire service aggressively, and then performs an extended phase to acquire service while conserving battery life.

Figure 2:
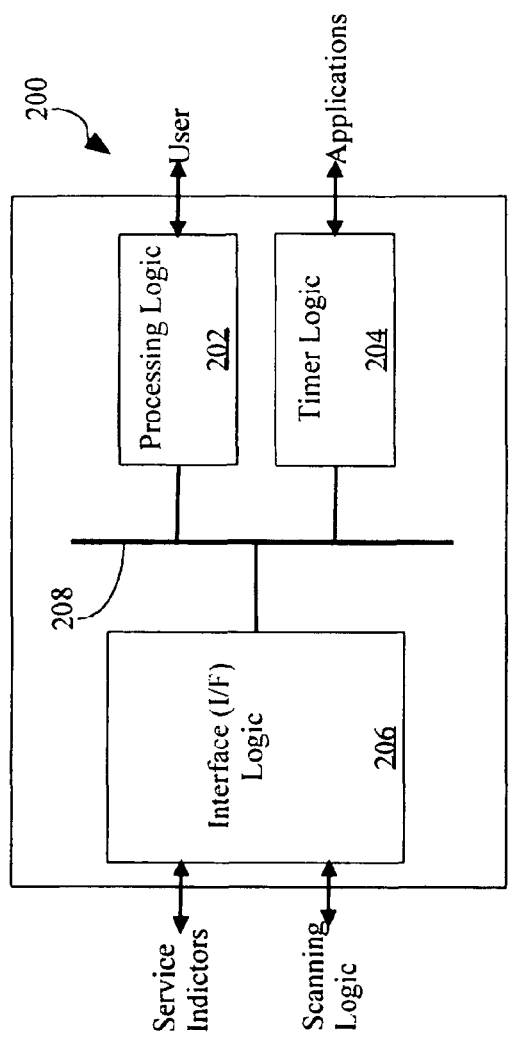
FIG. 2 shows exemplary acquisition control logic for use in aspects of a service acquisition system.

FIG. 2 shows exemplary acquisition control logic 200 for use in aspects of a service acquisition system. For example, the acquisition control logic 200 is suitable for use as the acquisition control logic 110 shown in FIG. 1. The acquisition control logic 200 comprises processing logic 202, timing logic 204, and interface (I/F) logic 206 all coupled to a data bus 208.

The interface logic 206 comprises at least one of a CPU, processor, gate array, hardware logic, memory elements, and/or hardware executing software. The interface logic 206 operates to receive service status indicators that indicate the current service status of a wireless communication device. For example the service status indicators indicate whether the wireless communication device is currently in-service or out-of-service. For example, the service status information may be received from a receiver at a wireless communication device, such as the receiver 106 shown in FIG. 1.

The interface logic 208 also operates to transmit acquisition control information to scanning logic that provides inner-loop acquisition at a device. The acquisition control information comprises an acquisition start time and duration. For example, if service acquisition in not immediately achieved, the sequence of acquisition start times may be based on an exponential function. The difference between two acquisition start times is referred to as a "backoff" time. Similarly, the sequence of scanning durations may be the same or different for each successive acquisition attempt. For example, each scanning duration time may be the same, shorter, or longer than the pervious scanning duration time.

The timer logic 204 comprises at least one of a CPU, processor, gate array, hardware logic, memory elements, and/or hardware executing software. In an aspect, the timer logic 204 operates to measure backoff and scan duration time intervals so that the processing logic 202 at the device can accurately control the timing of acquisition attempts provided by the inner-loop scanning logic. In an aspect, the timer logic 204 operates under the control of the processing logic 202 to measure the backoff and acquisition duration time intervals. The timer logic 204 also measures any other time intervals used in various aspects of the service acquisition system.

The processing logic 202 comprises at least one of a CPU, processor, gate array, hardware logic, memory elements, and/or hardware executing software. The processing logic 202 operates to determine when the device is out-of-service and control the inner-loop scanning logic at the device to attempt service acquisition. For example, the processing logic 202 receives service status indicators from the interface logic 208 and uses this information to determine whether or not the device is out-of-service. Once it is determined that the device is out-of-service, the processing logic 202 operates to control the inner-loop scanning logic at the device to attempt service acquisition.

In an aspect, the processing logic 202 operates to implement an acquisition algorithm that comprises an aggressive acquisition phase wherein a varying backoff time interval is provided between successive inner-loop acquisition attempts. In another aspect, the acquisition algorithm comprises an extended acquisition phase wherein periodic acquisition attempts are provided in a way to control power consumption. In still another aspect, the processing logic 202 operates to adjust the operation of the acquisition algorithm based on the receipt of new flow activations (i.e., request to decode content flows). A more detailed description of the operation of the acquisition control logic 200 is provided in other sections of this document.

In an aspect, the service acquisition system comprises a computer program product having one or more program instructions ("instructions") or sets of "codes" stored or embodied on a machine-readable medium, which when executed by at least one processor, for instance, a processor at the processing logic 202, operate to provide the functions described herein. For example, the sets of codes may be loaded into the acquisition control logic 200 from a machine-readable medium, such as a floppy disk, CDROM, memory card, FLASH memory device, RAM, ROM, or any other type of memory device or machine-readable medium that interfaces to the acquisition control logic 200. In another aspect, the sets of codes may be downloaded into the acquisition control logic 200 from an external device or communication network resource. The sets of codes, when executed by at least one processor, cause the acquisition control logic 200 to provide aspects of a service acquisition system as described herein.

Acquisition Algorithm Overview

In various aspects, the acquisition control logic 200 operates to perform an acquisition algorithm to acquire service with a serving system. The acquisition algorithm described below is referred to herein as an "outer-loop" algorithm, which controls how inner-loop scanning logic at a device attempts service acquisition. The outer-loop algorithm performed by the acquisition control logic 200 provides a mechanism for recovering from out-of-service conditions from which a single inner-loop acquisition attempt cannot recover. In an aspect, the algorithm determines a backoff interval between successive acquisition attempts until either acquisition is achieved, or a maximum allowed number of acquisition attempts is reached.

The algorithm operates the same regardless of whether the acquisition is targeted for wide-area or local-area signal acquisition. In various aspects, one or more outer-loop acquisition algorithms can run either independently or simultaneously to control inner-loop scanning logic at a device to perform service acquisition. For example, one outer-loop can run for wide-area service acquisition and a second outer-loop can run simultaneously or independently for local-area service acquisition.

In an aspect, the service acquisition system provides the acquisition algorithm is described below. An extended or modified version of the acquisition algorithm is presented in other sections of this document.

Acquisition Algorithm Description

In various aspects, the processing logic 202 operates to use the timer logic 204 and interface logic 206 to control the operation of inner-loop scanning logic at a device to attempt service acquisition. For example, if an initial inner-loop acquisition attempt fails, the processing logic 202 control the scanning logic to repeat the inner-loop service acquisition attempt for a selected duration and at selected time intervals until the total number of inner-loop service acquisition attempts reaches a specified maximum number of attempts (Nreacq). Thus, after an initial inner-loop acquisition attempt fails, the processing logic 202 controls the inner-loop scanning logic at the device so that (Nreacq−1) inner-loop acquisition attempts will be performed.

In an aspect, the timer logic 204 operates to measure the backoff time intervals so that after inner-loop acquisition attempt number i fails, where (0≦i≦Nreacq), the timer logic 204 measures a time interval Treacq(i) according to the following exponential backoff formula.

$$Treacq(i) = T1 * 2^{(alpha*(i-1))}$$

Thus, the following three parameters are used to control the inner-loop scanning logic in accordance with the acquisition algorithm.
1. The initial backoff value (T1).
2. The exponent factor (alpha).
3. The total number of acquisition attempts (Nreacq).

The parameters T1, alpha, and Nreacq are configurable during device manufacture, during device registration, and/or as downloadable parameters during device operation to enable the processing logic 202 to perform the acquisition outer-loop algorithm.

In an aspect, a first inner-loop acquisition attempt is run when the device was previously in-coverage or when flow downloads are triggered. In this case, the inner-loop acquisition attempt runs long enough to check whether the device is in coverage. For example, if the device loses service as the result of a deep-shadowing transmission condition which lasts less than 20 seconds, the processing logic 202 operates to control the scanning logic so that the first inner-loop acquisition attempt runs approximately 20 seconds.

If acquisition fails during the first inner-loop acquisition attempt, subsequent inner-loop acquisition attempts are performed. A failed acquisition in the first few seconds of the subsequent inner-loop acquisition attempt will most likely lead to a failed acquisition for the whole attempt. Thus, a shorter acquisition time duration is used for the subsequent inner-loop acquisition attempts. For example, for subsequent inner-loop acquisition attempts, a time duration of five seconds may be used.

Thus, the first inner-loop acquisition attempt is run for a duration of "Initial Acquisition Timer Threshold" seconds, and inner-loop acquisition attempts numbers 2 to Nreacq will be run for a duration of "Repeat Acquisition Timer Threshold" seconds.

Referring again to FIG. 1, the time line 114 shows an example of an outer-loop provided by the acquisition algorithm, where the total number of acquisition attempts is three. The intervals (B1, B2) shown on the timeline are the backoff time intervals between inner-loop acquisition attempts. For example, the backoff time intervals may be generated by the processing logic to be exponentially increasing in length. A successful service acquisition can stop the algorithm from running any time during the three inner-loop acquisition attempts.

Resetting the Acquisition Outer-Loop Algorithm

In an aspect, if the acquisition system determines that the system has not been acquired after a total of Nreacq inner-loop acquisition attempts, the device is considered to be out-of-coverage and the acquisition system will not try to acquire the serving system until an application requests the decoding of a content flow. In various aspects, the following events related to a request to decode a content flow can cause the processing logic 202 to attempt a service acquisition when the device is considered to be out-of-coverage.

1. Launching a user interface function triggers flow decoding of some application layer overhead flows. The application layer overhead flows provide information about flows available in the device's current location. In one possible implementation, the overhead flows may be organized in a hierarchical way where one master flow carries version information for all other overhead flows. This master flow is decoded first and other overhead flows are decoded as needed.
2. Activation (i.e., request to decode) of a real time service will trigger an attempt to demodulate a content flow, which in turn will trigger a system reacquisition.
3. The network may provide a file delivery service. The file delivery service allows a device to initiate a clip download carried by a known content flow at specific time periods advertised by the network. The device may be out-of-coverage when the request to decode the flow carrying the file delivery content. The clip download attempt causes the processing logic 202 to force an inner-loop reacquisition attempt.
4. Another type of content flow carries IP multicast service data. Device applications interested in this content may request the demodulation of these flows at various times. The request for flow content decoding causes a system reacquisition to occur if the device is out-of-coverage.

Figure 3:
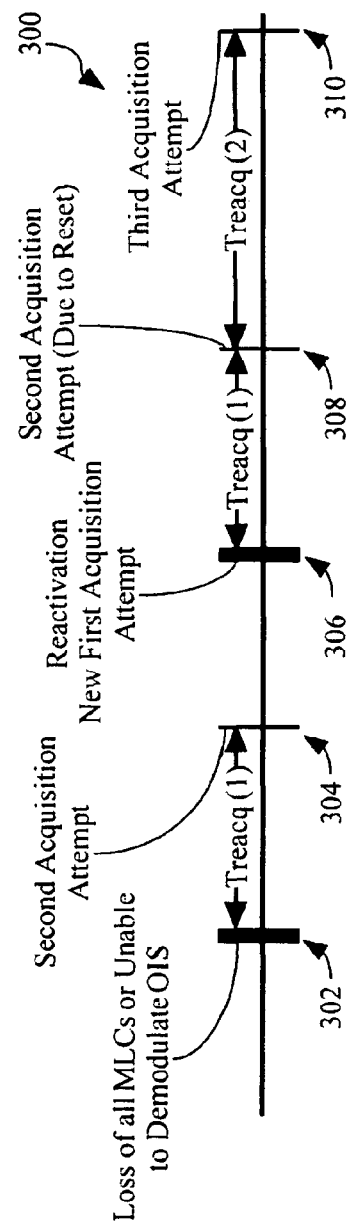
FIG. 3 shows a timing diagram that illustrates how a reset of an outer-loop algorithm is performed for use in aspects of a service acquisition system.

FIG. 3 shows a timing diagram 300 that illustrates how a reset of the outer-loop algorithm is performed for use in aspects of a service acquisition system. In an aspect, a first inner-loop acquisition 302 is attempted based on a loss of all media logical channels or the inability to demodulate overhead information symbols. In an aspect, the processing logic 202 operates to control the interface logic 206 to initiate the first inner-loop acquisition 302 attempt. A second acquisition 304 is attempted in accordance with the above algorithm, wherein the second acquisition 304 attempt has a shorter duration than the first acquisition attempt 302.

An activation 306 (i.e., request to decode selected content) occurs during the time when acquisition in the outer-loop is running. For example, as the result of a user interaction or program execution a request to decode selected content is received. In response to the activation, the processing logic 202 operates to reset or restart the acquisition algorithm from the beginning, wherein a new first inner-loop acquisition is attempted, also shown at 306. If service is not acquired, the processing logic 202 then operates to control the scanning logic to perform a second inner-loop acquisition attempt at 308. If service is still not acquired, the processing logic 202 then operates to control the scanning logic to perform a third inner-loop acquisition attempt at 310. Note that the duration of the inner-loop acquisition attempts and the time between inner-loop acquisition attempts is controlled by the processing logic 202 in accordance with the acquisition algorithm.

It should be noted that a reset of the outer-loop acquisition algorithm is performed whenever a new activation is received during the operation of the acquisition algorithm.

Extended Acquisition Algorithm Overview

In various aspects, the acquisition control logic 200 operates to perform an extended acquisition algorithm to acquire service with a serving system. The outer-loop algorithm provided in aspects of the extended acquisition algorithm provides a mechanism for recovering from extended loss-of-coverage periods from which a single inner-loop acquisition attempt cannot recover. First, an aggressive phase is provided wherein a backoff timer is used between successive acquisition attempts until either acquisition is achieved, or the maximum allowed number of acquisition attempts is reached. If the system is still not acquired, then an extended acquisition phase is provided wherein service acquisition is periodically attempted with a shorter duration. Thus, the outer-loop of the extended acquisition algorithm comprises two parts; an aggressive phase followed by an extended phase.

In an aspect, the extended acquisition algorithm responds to flow activation attempts (i.e., requests to decode content) by expiring whatever timer is currently set and continuing to run the algorithm as if the timer expired normally. If a request to decode a content flow coincides with an already active inner-loop phase of the extended acquisition algorithm, then the current acquisition attempt continues without interruption.

The extended acquisition algorithm operates the same regardless of whether the acquisition is targeted for wide-area or local-area signal acquisition. In various aspects, one or more outer-loop acquisition algorithms can run either independently or simultaneously to control scanning logic at a device to perform service acquisition. For example, one outer-loop can run for wide-area service acquisition and a second outer-loop can run simultaneously or independently for local-area service acquisition.

Extended Acquisition Algorithm Description

In an aspect, the extended acquisition algorithm performs the same aggressive phase as described above. For example, if an initial inner-loop acquisition attempt fails, the acquisition control logic 200 repeats the inner-loop acquisition attempts at selected (i.e., exponentially increasing) time intervals and for selected durations until the number of inner-loop acquisition attempts reaches a specified maximum number of attempts (Nreacq) in the aggressive phase.

In the extended acquisition algorithm, the aggressive phase utilizes five parameters that are defined as follows.
1. The initial backoff value (T1).
2. The exponent factor (alpha).
3. The number of attempts (Nreacq) in the aggressive phase of the algorithm.
4. The Initial Acquisition Timer Threshold that defines a desired duration of the first acquisition attempt in the aggressive phase.
5. The Repeat Acquisition Timer Threshold that defines a desired duration for subsequent acquisition attempts in the aggressive phase.

The extended phase of the outer-loop algorithm is executed if service is not acquired in the aggressive phase of the algorithm. The acquisition control logic 200 will attempt to acquire the signal periodically. The duration for which these periodic attempts are run, and the long term timeout value may be selected or determined using any suitable technique.

Thus, two more parameters are used in the extended acquisition phase as follows.
1. The Extended Phase backoff value (T2).
2. The Extended Phase Acquisition Timer Threshold that defines a desired duration for each acquisition in the extended phase.

Figure 4:
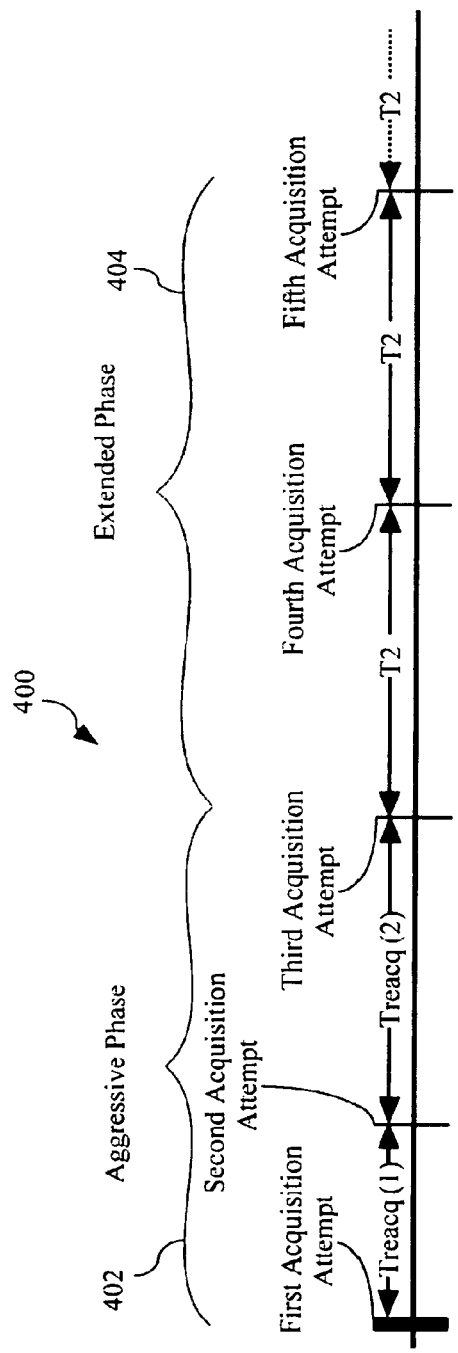
FIG. 4 shows a timing diagram that illustrates the operation of an extended acquisition algorithm for use in aspects of a service acquisition system.

FIG. 4 shows a timing diagram 400 that illustrates the operation of an extended phase of the extended acquisition algorithm for use in aspects of a service acquisition system. The timing diagram 400 shows an aggressive phase 402 where the total number of acquisition attempts is three. An extended acquisition phase 404 then occurs to provide subsequent acquisition attempts at periodic time intervals. A successful acquisition stops the algorithm from running at any time during the inner-loop acquisition attempts.

Effect of Activations on the Extended Acquisition Outer-Loop Algorithm

In an aspect, the outer-loop algorithm is reset once the serving signal is acquired. However, a flow activation (i.e., request to decode content) will have the following effect on the outer-loop algorithm.
1. If the device is in the middle of an inner-loop acquisition attempt when the activation occurs, then the device will continue the current acquisition attempt.
2. If the device is out-of-coverage and has a timer set for triggering an acquisition attempt, then the activation will trigger the expiration of the current timer so that the algorithm continues operations as if the timer expired normally. The duration of the acquisition attempt and the length of the consequent timeout, if any, depend on the number of the current acquisition attempt within the context of the outer-loop algorithm.

Figure 5:
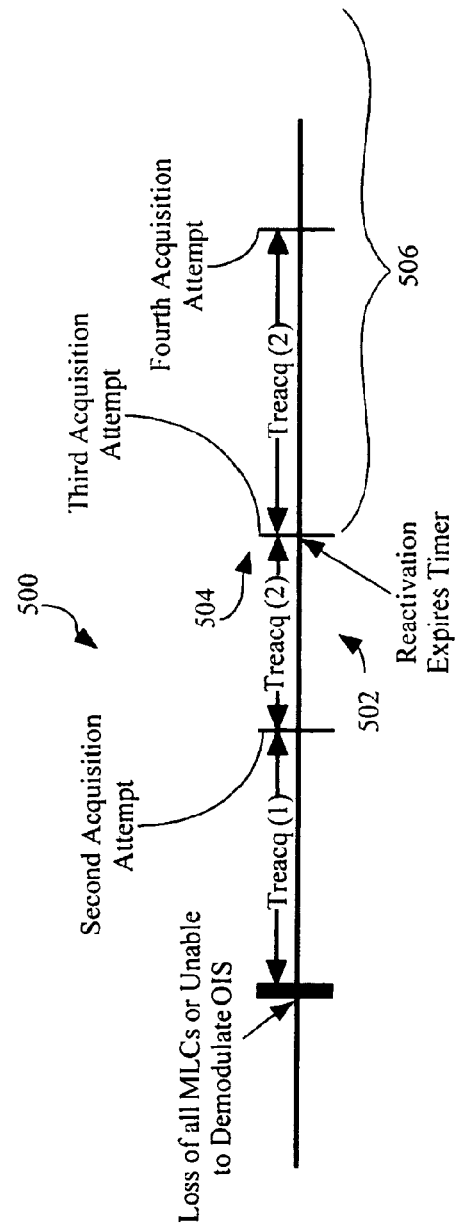
FIG. 5 shows a timing diagram that illustrates the effect of content flow activation on the extended phase of an outer-loop algorithm.

FIG. 5 shows a timing diagram 500 that illustrates the effect of a content flow activation on the extended acquisition phase outer-loop algorithm. For example, the timeline 500 illustrates operation of the extended reacquisition outer-loop algorithm when the activation occurs during a second acquisition timeout. As illustrated in FIG. 5, a second acquisition timeout occurs at 502. During this time, a new content flow activation occurs at 504. In response, the extended acquisition outer-loop algorithm operates to expire the timing of the second timeout and initiate a third acquisition attempt. If service is not acquired during the third acquisition attempt, the extended acquisition outer-loop algorithm operates to provide the extended acquisition phase as illustrated at 506.

Output Indications

Figure 6:
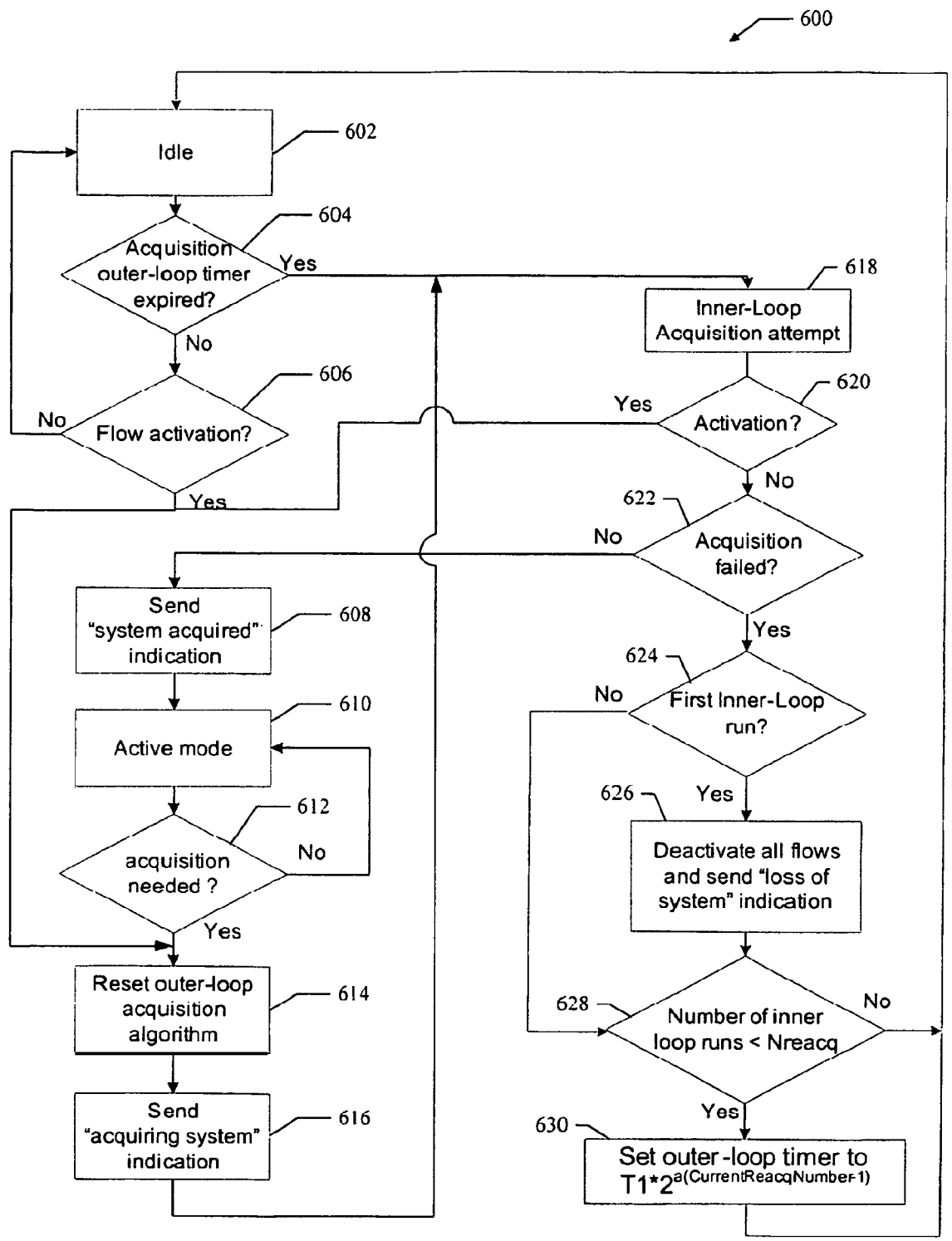
FIG. 6 shows an exemplary method for service acquisition provided by aspects of a service acquisition system.

In various aspects, the acquisition system operates to output various indications to a user and/or applications executing at a device. For example, the processing logic 202 operates to output the following list of indications to a user and/or applications executing at a device. It should be noted that the following list is not exhaustive and that any additional indications may be output by the processing logic 202.
1. Loss of System
2. Acquiring System
3. System Acquired FIG. 6 shows an exemplary method 600 for service acquisition provided by aspects of a service acquisition system. For example, the method 600 provides outer-loop processing according to the acquisition algorithm described above. For clarity, the method 600 is described below with reference to the acquisition control logic 200 shown in FIG. 2. In an aspect, the processing logic 202 executes one or more sets of codes to control the acquisition control logic 200 to perform the functions described below.

At block 602, the service acquisition system is in an idle state.

At block 604, a determination is made as to whether an acquisition outer-loop timer has expired. For example, the timer logic 204 maintains the outer-loop timer and if the outer-loop time has expired, the method proceeds to block 618. If the outer-loop timer has not expired, the method proceeds to block 606.

At block 606, a determination is made as to whether a flow activation has been received. In an aspect, the processing logic 202 operates to receive flow activations from applications at a device. The processing logic 202 operates to determine if a new flow activation has been received. If a flow activation has been received, the method proceeds to block 614. If a flow activation has not been received, the method proceeds to block 602.

At block 618, a system acquisition is attempted. In an aspect, the processing logic 202 controls the interface logic 206 to start an inner-loop acquisition attempt by scanning logic at the device. Thus an inner-loop acquisition is attempted for a selected duration determined by the processing logic 202.

At block 620, a determination is made as to whether a flow activation has been received during the ongoing inner-loop scan. In an aspect, the processing logic 202 makes this determination. If a flow activation has been received, the method proceeds to block 614. If a flow activation has not been received, the method proceeds to block 622.

At block 622, a determination is made as to whether the acquisition attempt has failed. In an aspect, the interface logic 206 receives service indicators that are passed to the processing logic 202. The processing logic 202 then determines if the acquisition attempt has failed. If the acquisition attempt has not failed, the method proceeds to block 608. If the acquisition attempt has failed, the method proceeds to block 624.

At block 608, a "system acquired" indication is provided. In an aspect, the processing logic 202 operates to send the indication to a device user and/or applications at the device.

At block 610, the device is in an active mode. Thus, the device is currently in-service.

At block 612, a determination is made as to whether service acquisition is needed. In an aspect, the interface logic 206 receives service indicators that are passed to the processing logic 202. The processing logic 202 then determines if service has been lost and service acquisition is needed. If service acquisition is not needed, the method proceeds to block 610. If service acquisition is needed, the method proceeds to block 614.

At block 614, the outer-loop acquisition algorithm is reset. In an aspect, the processing logic 202 operates to reset the outer-loop acquisition algorithm. Thus, the scanning duration is reset and the backoff time interval is reset.

At block 616, an "acquiring system" indication is provided. In an aspect, the processing logic 202 operates to provide this indication to a device user and/or applications at the device.

At block 624, a determination is made as to whether the recent acquisition failure was a first inner-loop attempt. In an aspect, the processing logic 202 makes this determination. If it was a first inner-loop attempt, the method proceeds to block 626. If it was not a first inner-loop attempt, the method proceeds to block 628.

At block 626, all flows are deactivated and a "loss of system" indication is sent. In an aspect, the processing logic 202 operates to deactivate all flows so that associated flow data will not be received. The processing logic 202 also operates to send the "loss of system" indication to a device user and/or applications at the device.

At block 628, a determination is made as to whether the number of inner-loop attempts is less than a selected limit (Nreacq). In an aspect, the processing logic 202 makes this determination. If the number of attempts is less than it was Nreacq, the method proceeds to block 630. If the number of attempts is not less than it was Nreacq, the method proceeds to block 602.

At block 630, the outer-loop timer is adjusted for the next acquisition attempt. In an aspect, the timer logic 204 maintains an outer-loop timer that is set to a value equal to $(T1*2^{[alpha*(CurrentReacqNumber-1)]})$. The method then proceeds to block 602.

Therefore, the method 600 operates to provide a acquisition algorithm for use in aspects of a service acquisition system. It should be noted that the method 600 is just one implementation and that the operations of the method 600 may be rearranged or otherwise modified within the scope of the various aspects. Thus, other implementations are possible with the scope of the various aspects described herein.

Figure 7:
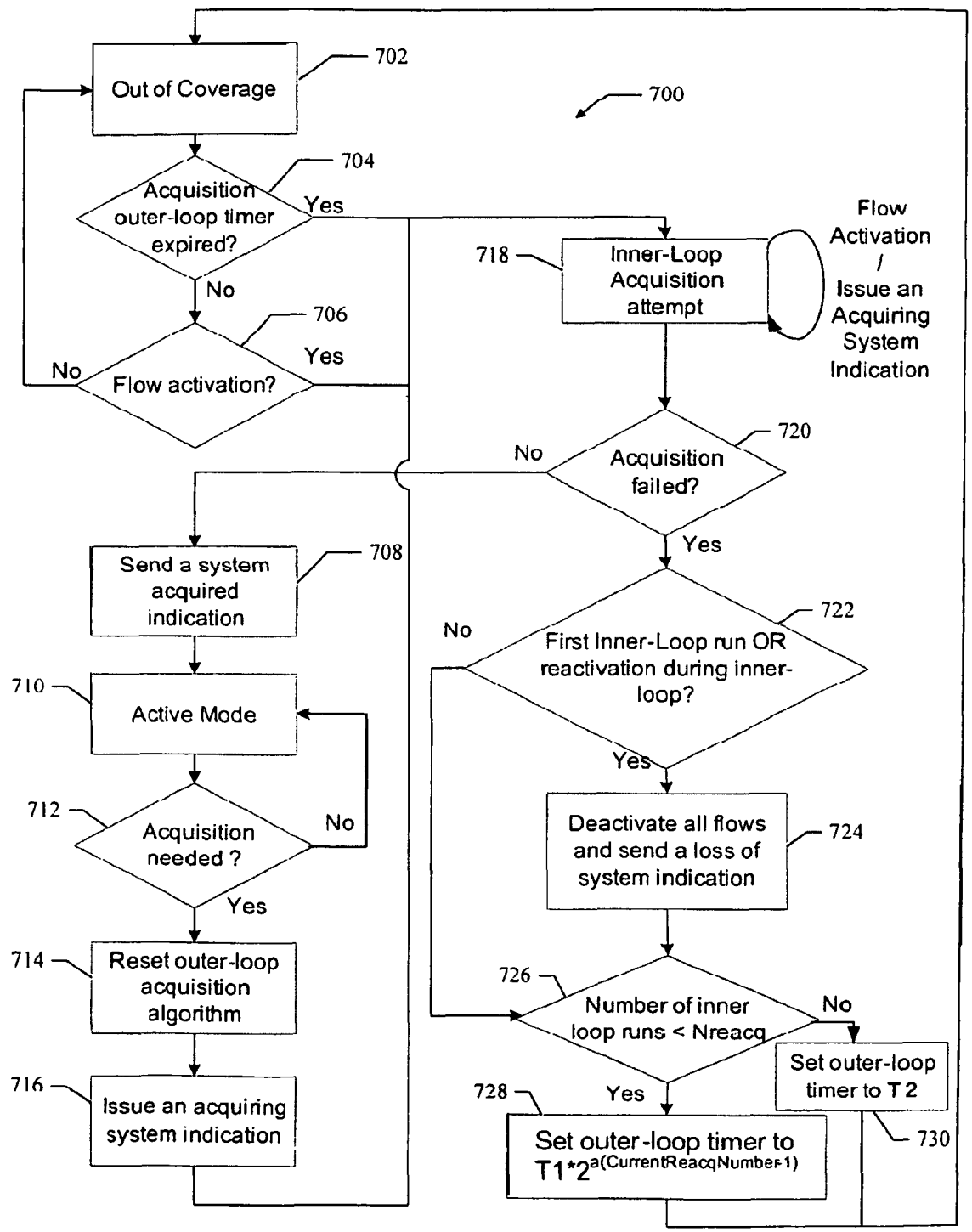
FIG. 7 shows an exemplary method for service acquisition provided by aspects of a service acquisition system.

FIG. 7 shows an exemplary method 700 for service acquisition provided by aspects of a service acquisition system. For example, the method 700 provides outer-loop processing according to an extended reacquisition algorithm as described above. For clarity, the method 700 is described below with reference to the acquisition control logic 200 shown in FIG. 2. In an aspect, the processing logic 202 executes one or more sets of codes to control the acquisition control logic 200 to perform the functions described below.

At block 702, an out of coverage condition exists. In an aspect, the service acquisition system has determined that a device is out-of-coverage according to the acquisition algorithm described above.

At block 704, a determination is made as to whether an outer-loop timer has expired. For example, the timer logic 204 maintains the outer-loop timer and if the outer-loop time has expired, the method proceeds to block 718. If the outer-loop timer has not expired, the method proceeds to block 706.

At block 706, a determination is made as to whether a flow activation has been received. In an aspect, the processing logic 202 operates to receive flow activations from applications at a device. The processing logic 202 operates to determine if a new flow activation has been received. If a flow activation has been received, the method proceeds to block 718. If a flow activation has not been received, the method proceeds to block 702.

At block 718, a system acquisition is attempted. In an aspect, the processing logic 202 controls the interface logic 206 to start an inner-loop acquisition attempt by scanning logic at the device. Thus an inner-loop acquisition is attempted for a selected duration determined by the processing logic 202. New flow activations received once the acquisition attempt is started result in an "acquiring system" indication being sent by the processing logic 202.

At block 720, a determination is made as to whether the acquisition attempt has failed. In an aspect, the interface logic 206 receives service indicators that are passed to the processing logic 202. The processing logic 202 then determines if the acquisition attempt has failed. If the acquisition attempt has not failed, the method proceeds to block 708. If the acquisition attempt has failed, the method proceeds to block 722.

At block 708, a "system acquired" indication is provided. In an aspect, the processing logic 202 operates to send the indication to a device user and/or applications at the device.

At block 710, the device is in an active mode. Thus, the device is currently in-service.

At block 712, a determination is made as to whether service acquisition is needed. In an aspect, the interface logic 206 receives service indicators that are passed to the processing logic 202. The processing logic 202 then determines if service has been lost and service acquisition is needed. If service acquisition is not needed, the method proceeds to block 710. If service acquisition is needed, the method proceeds to block 714.

At block 714, the outer-loop acquisition algorithm is reset. In an aspect, the processing logic 202 operates to reset the outer-loop acquisition algorithm. Thus, the scanning duration is reset and the backoff time interval is reset.

At block 716, an "acquiring system" indication is provided. In an aspect, the processing logic 202 operates to provide this indication to a device user and/or applications at the device.

At block 722, a determination is made as to whether the recent acquisition failure was a first inner-loop attempt or the result of a new activation. In an aspect, the processing logic 202 makes this determination. If it was a first inner-loop attempt or the result of a new activation, the method proceeds to block 724. If it was not a first inner-loop attempt or the result of a new activation, the method proceeds to block 726.

At bloc 724, all flows are deactivated and a "loss of system" indication is sent. In an aspect, the processing logic 202 operates to deactivate all flows so that associated flow data will not be received. The processing logic 202 also operates to send the "loss of system" indication to a device user and/or applications at the device.

At block 726, a determination is made as to whether the number of inner-loop attempts is less than a selected limit (Nreacq). In an aspect, the processing logic 202 makes this determination. If the number of attempts is less than it was Nreacq, the method proceeds to block 728. If the number of attempts is not less than it was Nreacq, the method proceeds to block 730.

At block 728, the outer-loop timer is adjusted for the next acquisition attempt. In an aspect, the timer logic 204 maintains an outer-loop timer that is set to a value equal to ($T1*2^{[alpha*(CurrentReacqNumber-1)]}$). The method then proceeds to block 702.

At block 730, the outer-loop timer is set to a time value of T2. In an aspect, the timer logic 204 maintains an outer-loop timer that is set to the value of T2, where T2 is the time interval used for periodic acquisition attempts. The method then proceeds to block 702

Therefore, the method 700 operates to provide an extended acquisition algorithm for use in aspects of a service acquisition system. It should be noted that the method 700 is just one implementation and that the operations of the method 700 may be rearranged or otherwise modified within the scope of the various aspects. Thus, other implementations are possible with the scope of the various aspects described herein.

Figure 8:
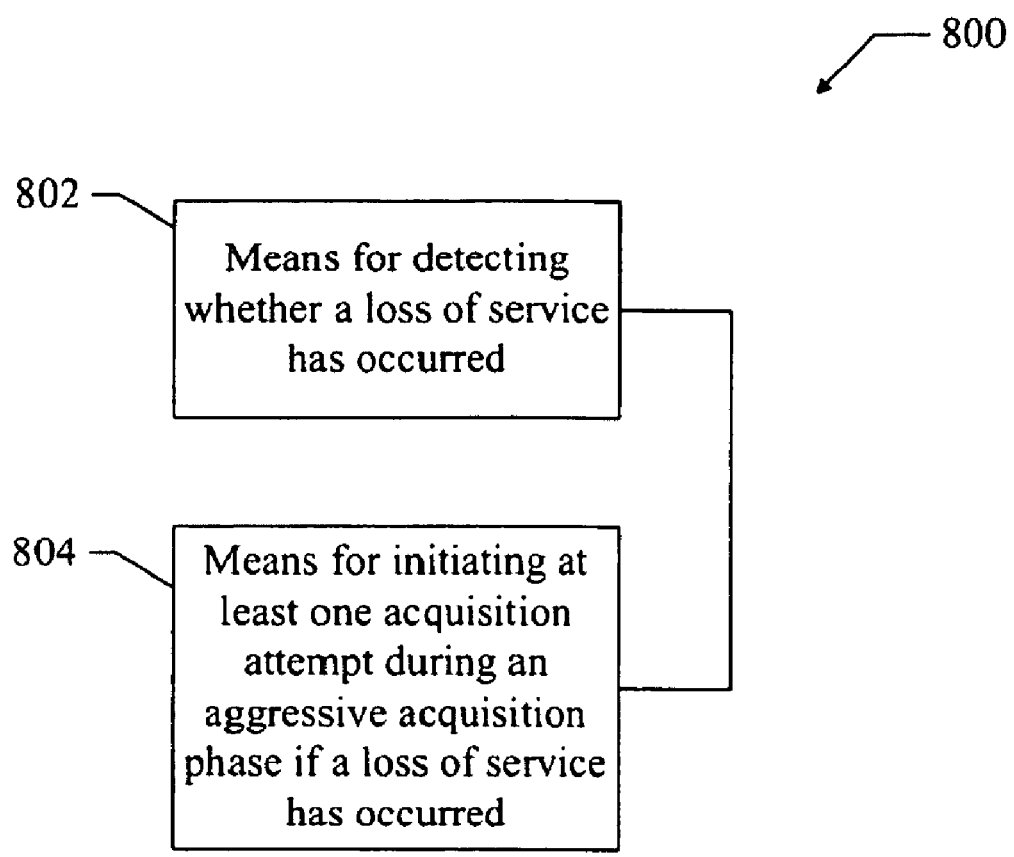
FIG. 8 shows exemplary acquisition control logic for use in aspects of a service acquisition system.

FIG. 8 shows exemplary acquisition control logic 800 for use in aspects of a service acquisition system. For example, the acquisition control logic 800 is suitable for use as the acquisition control logic 200 shown in FIG. 2. In an aspect, the acquisition control logic 800 is implemented by at least one integrated circuit comprising one or more modules configured to provide aspects of an acquisition system as described herein. For example, in an aspect, each module comprises hardware and/or hardware executing software.

The acquisition control logic 800 comprises a first module comprising means (802) for detecting whether a loss of service has occurred, which in an aspect comprises the interface logic 206. The acquisition control logic 800 also comprises a second module comprising means (804) for initiating at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed, which in an aspect comprises the processing logic 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a service acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for service acquisition in a broadcast system, the method comprising:
   detecting whether a loss of service has occurred; and
   initiating at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed,
   wherein said initiating comprises initiating a first acquisition attempt having a first duration and at least one additional acquisition attempt having a duration shorter than the first duration.

2. The method of claim 1, further comprising initiating an extended acquisition phase after the aggressive acquisition phase, wherein fixed or variable time intervals are provided between additional acquisition attempts, and wherein the additional acquisition attempts have fixed or varying durations.

3. The method of claim 2, further comprising determining the durations and the time intervals between the additional acquisition attempts to achieve a selected power utilization.

4. The method of claim 2, further comprising determining the aggressive acquisition phase and the extended acquisition phase so that an average time interval between acquisition attempts in the aggressive acquisition phase is less than an average time interval between acquisition attempts in the extended acquisition phase.

5. The method of claim 2, further comprising determining the aggressive acquisition phase and the extended acquisition phase so that an average power utilization in the aggressive acquisition phase is more than an average power utilization in the extended acquisition phase.

6. The method of claim 2, further comprising determining the extended acquisition phase so that an average power utilization in the extended acquisition phase meets a selected target.

7. The method of claim 6, wherein the selected target is equal to an average power utilization in standby mode when in-service.

8. The methods of claims 1, further comprising providing a status indicator selected from one of loss of system, acquiring system, and system acquired.

9. The method of claim 1, further comprising re-establishing at least one flow download if service is acquired in the aggressive acquisition phase.

10. The method of claim 1, further comprising ending at least one flow download if service is not acquired by the end of the aggressive acquisition phase.

11. An apparatus for service acquisition in a broadcast system, the apparatus comprising:
   interface logic configured to detect whether a loss of service has occurred; and
   processing logic configured to initiate at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed,
   wherein said processing logic is configured to initiate a first acquisition attempt having a first duration and at least one additional acquisition attempt having a duration shorter than the first duration.

12. The apparatus of claim 11, wherein said processing logic is configured to initiate an extended acquisition phase after the aggressive acquisition phase, wherein fixed or variable time intervals are provided between additional acquisition attempts, and wherein the additional acquisition attempts have fixed or varying durations.

13. The apparatus of claim 12, wherein said processing logic is configured to determine the durations and the time intervals between the additional acquisition attempts to achieve a selected power utilization.

14. The apparatus of claim 12, wherein said processing logic is configured to determine the aggressive acquisition phase and the extended acquisition phase so that an average time interval between acquisition attempts in the aggressive acquisition phase is less than an average time interval between acquisition attempts in the extended acquisition phase.

15. The apparatus of claim 12, wherein said processing logic is configured to determine the aggressive acquisition phase and the extended acquisition phase so that an average power utilization in the aggressive acquisition phase is more than an average power utilization in the extended acquisition phase.

16. The apparatus of claim 12, wherein said processing logic is configured to determine the extended acquisition phase so that an average power utilization in the extended acquisition phase meets a selected target.

17. The apparatus of claim 16, wherein the selected target is equal to an average power utilization in standby mode when in-service.

18. The apparatus of claims 11, wherein said processing logic is configured to provide a status indicator selected from one of loss of system, acquiring system, and system acquired.

19. The apparatus of claim 11, wherein said processing logic is configured to re-establish at least one flow download if service is acquired in the aggressive acquisition phase.

20. The apparatus of claim 11, wherein said processing logic is configured to end at least one flow download if service is not acquired by the end of the aggressive acquisition phase.

21. An apparatus for service acquisition in a broadcast system, the apparatus comprising:
   means for detecting whether a loss of service has occurred; and
   means for initiating at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed,
   wherein said means for initiating comprises means for initiating a first acquisition attempt having a first duration and at least one additional acquisition attempt having a duration shorter than the first duration.

22. The apparatus of claim 21, further comprising means for initiating an extended acquisition phase after the aggressive acquisition phase, wherein fixed or variable time intervals are provided between additional acquisition attempts, and wherein the additional acquisition attempts have fixed or varying durations.

23. The apparatus of claim 22, further comprising means for determining the durations and the time intervals between the additional acquisition attempts to achieve a selected power utilization.

24. The apparatus of claim 22, further comprising means for determining the aggressive acquisition phase and the extended acquisition phase so that an average time interval between acquisition attempts in the aggressive acquisition phase is less than an average time interval between acquisition attempts in the extended acquisition phase.

25. The apparatus of claim 22, further comprising means for determining the aggressive acquisition phase and the extended acquisition phase so that an average power utilization in the aggressive acquisition phase is more than an average power utilization in the extended acquisition phase.

26. The apparatus of claim 22, further comprising means for determining the extended acquisition phase so that an average power utilization in the extended acquisition phase meets a selected target.

27. The apparatus of claim 26, wherein the selected target is equal to an average power utilization in standby mode when in-service.

28. The apparatus of claims 21, further comprising means for providing a status indicator selected from one of loss of system, acquiring system, and system acquired.

29. The apparatus of claim 21, further comprising means for re-establishing at least one flow download if service is acquired in the aggressive acquisition phase.

30. The apparatus of claim 21, further comprising means for ending at least one flow download if service is not acquired by the end of the aggressive acquisition phase.

31. A computer program product for service acquisition in a broadcast system, the computer program product comprising:
   a non-transitory machine-readable medium comprising:
   a first set of codes for causing a computer to detect whether a loss of service has occurred; and
   a second set of codes for causing the computer to initiate at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed,
   wherein said second set of codes is configured for causing the computer to initiate a first acquisition attempt having a first duration and at least one additional acquisition attempt having a duration shorter than the first duration.

32. The computer program product of claim 31, wherein said second set of codes is configured for causing the computer to initiate an extended acquisition phase after the aggressive acquisition phase, wherein fixed or variable time intervals are provided between additional acquisition attempts, and wherein the additional acquisition attempts have fixed or varying durations.

33. The computer program product of claim 31, wherein said second set of codes is configured for causing the computer to determine the durations and the time intervals between the additional acquisition attempts to achieve a selected power utilization.

34. The computer program product of claim 33, wherein said second set of codes is configured for causing the computer to determine the aggressive acquisition phase and the extended acquisition phase so that an average time interval between acquisition attempts in the aggressive acquisition phase is less than an average time interval between acquisition attempts in the extended acquisition phase.

35. The computer program product of claim 33, wherein said second set of codes is configured for causing the computer to determine the aggressive acquisition phase and the extended acquisition phase so that an average power utilization in the aggressive acquisition phase is more than an average power utilization in the extended acquisition phase.

36. The computer program product of claim 33, wherein said second set of codes is configured for causing the computer to determine the extended acquisition phase so that an average power utilization in the extended acquisition phase meets a selected target.

37. The computer program product, wherein the selected target is equal to an average power utilization in standby mode when in-service.

38. The computer program product of claims 31, wherein said second set of codes is configured for causing the computer to provide a status indicator selected from one of loss of system, acquiring system, and system acquired.

39. The computer program product of claim 31, wherein said second set of codes is configured for causing the computer to re-establish at least one flow download if service is acquired in the aggressive acquisition phase.

40. The computer program product of claim 31, wherein said second set of codes is configured for causing the computer to end at least one flow download if service is not acquired by the end of the aggressive acquisition phase.

41. At least one integrated circuit configured for service acquisition in a broadcast system, the at least one integrated circuit comprising:
   a first module configured to detect whether a loss of service has occurred; and
   a second module configured to initiate at least one acquisition attempt during an aggressive acquisition phase if a loss of service has occurred, wherein a backoff time interval between successive acquisition attempts is constant or increased, and wherein the aggressive acquisition phase ends when service acquisition is achieved or a selected number of acquisition attempts have been performed,
   wherein said second module is configured to initiate a first acquisition attempt having a first duration and at least one additional acquisition attempt having a duration shorter than the first duration.

42. The at least one integrated circuit of claim 41, wherein said second module is configured to initiate an extended acquisition phase after the aggressive acquisition phase, wherein fixed or variable time intervals are provided between additional acquisition attempts, and wherein the additional acquisition attempts have fixed or varying durations.

43. The at least one integrated circuit of claim 42, wherein said second module is configured to determine the durations and the time intervals between the additional acquisition attempts to achieve a selected power utilization.

44. The at least one integrated circuit of claim 42, wherein said second module is configured to determine the aggressive acquisition phase and the extended acquisition phase so that an average time interval between acquisition attempts in the aggressive acquisition phase is less than an average time interval between acquisition attempts in the extended acquisition phase.

45. The at least one integrated circuit of claim 42, wherein said second module is configured to determine the aggressive acquisition phase and the extended acquisition phase so that an average power utilization in the aggressive acquisition phase is more than an average power utilization in the extended acquisition phase.

46. The at least one integrated circuit of claim 42, wherein said second module is configured to determine the extended acquisition phase so that an average power utilization in the extended acquisition phase meets a selected target.

47. The at least one integrated circuit of claim 46, wherein the selected target is equal to an average power utilization in standby mode when in-service.

48. The at least one integrated circuit of claims 41, wherein said second module is configured to provide a status indicator selected from one of loss of system, acquiring system, and system acquired.

49. The at least one integrated circuit of claim 41, wherein said second module is configured to re-establish at least one flow download if service is acquired in the aggressive acquisition phase.

50. The at least one integrated circuit of claim 41, wherein said second module is configured to end at least one flow download if service is not acquired by the end of the aggressive acquisition phase.

* * * * *